United States Patent
Horigome et al.

(10) Patent No.: US 10,154,188 B2
(45) Date of Patent: Dec. 11, 2018

(54) CAMERA SYSTEM, MASTER CAMERA DEVICE, AND SLAVE CAMERA DEVICE

(71) Applicant: JVC KENWOOD CORPORATION, Yokohama-shi, Kanagawa (JP)

(72) Inventors: Akinobu Horigome, Yokohama (JP); Kazuya Tanaka, Yokohama (JP); Akio Kongo, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 305 days.

(21) Appl. No.: 14/993,178

(22) Filed: Jan. 12, 2016

(65) Prior Publication Data

US 2016/0127626 A1    May 5, 2016

Related U.S. Application Data (63) Continuation of application No. PCT/JP2014/073101, filed on Sep. 2, 2014.

(30) Foreign Application Priority Data

Sep. 20, 2013 (JP) ................. 2013-195932

(51) Int. Cl.
*H04N 5/00* (2011.01)
*H04N 7/00* (2011.01)
(Continued)

(52) U.S. Cl.
CPC ............. *H04N 5/232* (2013.01); *H04N 5/247* (2013.01); *H04N 7/181* (2013.01);
(Continued)

(58) Field of Classification Search
CPC .. H04L 12/56; H04L 1/18; H04N 7/18; H04N 7/173
See application file for complete search history.

(56) References Cited

U.S. PATENT DOCUMENTS

2011/0179329 A1* 7/2011 Kim ................... H04L 1/1825
                                                            714/748
2012/0320928 A1* 12/2012 Takada ................ H04L 45/00
                                                            370/401

FOREIGN PATENT DOCUMENTS

WO    2012011301    1/2012

OTHER PUBLICATIONS

International Search Report for International Patent Application No. PCT/JP2014/073101 dated Dec. 2, 2014, 2 pages.

* cited by examiner

*Primary Examiner* — Jeffery A Williams
*Assistant Examiner* — Patricia I Young
(74) *Attorney, Agent, or Firm* — Amin, Turocy & Watson LLP (57) ABSTRACT

A master camera device and a plurality of slave camera devices are directly connected through a network, and form one network segment. The master camera device performs multicast communication with each slave camera device, and acquires information representing a transmission condition from each slave camera device. In a case where a worsening transmission condition relative to a predetermined threshold is detected from a transmission condition of each slave camera device and a transmission condition of the master camera device, the master camera device performs multicast communication with each slave camera device, and controls an encoding level representing a degree of encoding process, sequentially from an encoder having a lower priority, including the encoder of the master camera device, to improve the transmission condition. Thus, by an efficient communication, the transmission condition is improved from an initial stage having an unstable transmission condition, to obtain a preferable real-time image.

7 Claims, 8 Drawing Sheets

(51) Int. Cl.
*H04N 5/247* (2006.01)
*H04N 5/232* (2006.01)
*H04N 7/18* (2006.01)
*H04N 19/115* (2014.01)
*H04N 19/127* (2014.01)
*H04N 19/164* (2014.01)
*H04N 19/169* (2014.01)

(52) U.S. Cl.
CPC ......... *H04N 19/115* (2014.11); *H04N 19/127* (2014.11); *H04N 19/164* (2014.11); *H04N 19/188* (2014.11)

| | | |
|---|---|---|
| GENERAL VIEWER | | |
| BASIC SETTING 1 | | |
| BASIC SETTING 2 | | |
| ADVANCED SETTINGS | | |

[ OK ]  [ CANCEL ]

NETWORK

| | | | | |
|---|---|---|---|---|
| IP SETTING | STATIC IP ▶ | | | |
| IP ADDRESS | 192 | 168 | 0 | 2 |
| SUBNET MASK | 255 | 255 | 255 | 0 |
| DEFAULT GATEWAY | 0.0.0.0 | | | |

NETWORK DELIVERY CONTROL

MASTER CAMERA   ⦿ ON  ○ OFF

| | | | |
|---|---|---|---|
| FIRST ENCODER | PRIORITY | LEVEL 5 ▶ | |
| | OBJECT TO BE CONTROLLED | ⦿ IMAGE QUALITY CONTROL | ○ FRAME RATE CONTROL |
| SECOND ENCODER | PRIORITY | LEVEL 3 ▶ | |
| | OBJECT TO BE CONTROLLED | ⦿ IMAGE QUALITY CONTROL | ○ FRAME RATE CONTROL |
| THIRD ENCODER | PRIORITY | LEVEL 1 ▶ | |
| | OBJECT TO BE CONTROLLED | ⦿ IMAGE QUALITY CONTROL | ○ FRAME RATE CONTROL |

```
2013.01.01 08:30:10 LEVEL 1
2013.01.01 08:32:20 LEVEL 2
2013.01.01 09:01:50 LEVEL 3
2013.01.01 09:28:30 LEVEL 2
2013.01.01 10:22:00 LEVEL 1
2013.01.01 10:31:50 LEVEL 0
2013.01.01 11:44:30 LEVEL 1
2013.01.01 11:50:10 LEVEL 0
2013.01.01 11:51:00 LEVEL 1
2013.01.01 12:26:50 LEVEL 0
2013.01.01 17:07:30 LEVEL 1
2013.01.01 17:40:00 LEVEL 0
2013.01.01 17:58:20 LEVEL 1
2013.01.01 18:01:10 LEVEL 0
```

CAMERA SYSTEM, MASTER CAMERA DEVICE, AND SLAVE CAMERA DEVICE

CROSS-REFERENCE TO RELATED APPLICATION(S)

This application is a continuation of PCT international application Ser. No. PCT/JP2014/073101 filed on Sep. 2, 2014 which designates the United States, incorporated herein by reference, and which claims the benefit of priority from Japanese Patent Application No. 2013-195932, filed on Sep. 20, 2013.

BACKGROUND OF THE INVENTION

1. Field of the Invention

The present invention relates to a camera system, a master camera device, and a slave camera device.

2. Description of the Related Art

Conditions for watching live video from a surveillance camera device through a network are different from those for watching video on a video hosting website. For example, when watching video on a video hosting website, a delivered video stream is temporarily stored in a memory without being reproduced soon. In a case where a certain amount of video data is stored in the memory, the video data stored in the memory is read and reproduction thereof is started. Therefore, watching video on a video hosting website is not influenced by network traffic congestion, and stable reproduction is enabled.

In contrast, for example, when watching live video from a surveillance camera system in a parking area, a shopping mall, or the like, a captured image needs to be displayed instantly (needs to be displayed in real-time), and storage of the captured image in a memory is not allowed as in the case of the video on the video hosting website. Thus, in the surveillance camera system, network traffic congestion causes loss of smoothness in video due to discontinuous image, and packets of the captured image are disadvantageously discarded at last.

WO 2012/011301 A discloses a technology of grasping network congestion and controlling network traffic. According to WO2012/011301 A, traffic between a transmission end and a reception end is controlled based on packet discard information from a network switch.

However, discarding packets is a worst case finally generated by the network traffic congestion. Therefore, the technology according to WO 2012/011301 A represents a technology of controlling traffic after the worst case of discarding packets. Accordingly, in the technology according to WO 2012/011301 A, it is difficult to improve, for example, loss of smoothness of video caused by an unstable frame transmission interval occurring in initial congestion of the network traffic.

Further, in the technology according to WO 2012/011301 A, cameras are controlled through a repeater such as a switch. Therefore, even if an attempt is made to simultaneously control the cameras using multicast communication, the repeater such as a switch may block a control signal through the multicast communication. Accordingly, in the technology according to WO 2012/011301 A, control needs to be performed by designating the cameras one by one, and the control is inefficiently performed.

Therefore, the present invention provides a camera system, a master camera device, and a slave camera device which provide efficient communication, improving a transmission condition at an initial stage of an unstable transmission condition, providing a preferable real-time image.

SUMMARY OF THE INVENTION

It is an object of the present invention to at least partially solve the problems in the conventional technology. According to an aspect of the invention, a camera system comprises: one or a plurality of master camera devices; and one or a plurality of slave camera devices that are directly connected to the one or the plurality of master camera devices through a network, and form one network segment together with the one or the plurality of master camera devices. Each of the one or the plurality of master camera devices and the one or the plurality of slave camera devices includes one or a plurality of encoders, each of which having a priority, and configured to form and transmit encoded data obtained by performing predetermined encoding process on a captured image, and a detection unit that detecting a transmission condition of the encoded data, and forming transmission condition information. Each of the one or the plurality of master camera devices further includes a transmission condition acquisition unit that communicates with each of the one or the plurality of slave camera devices, acquires the transmission condition information from each of the one or the plurality of slave camera devices, and acquires the transmission condition information detected by the detection unit of the each of the one or the plurality of master camera devices, and a control unit that communicates with the one or the plurality of slave camera devices upon detection of a worsening transmission condition relative to a predetermined threshold, from the transmission condition information, and controls an encoding level representing a degree of the encoding process, sequentially from an encoder having a lower priority, including encoders of the one or the plurality of master camera devices, to improve the transmission condition.

According to further aspect of the invention, a master camera device is directly connected to one or a plurality of slave camera devices through a network to form one network segment, and the master camera device comprises: one or a plurality of encoders, each of which having a priority, forming and transmitting encoded data obtained by performing predetermined encoding process on a captured image; a detection unit detecting a transmission condition of the encoded data, and forming transmission condition information; a transmission condition acquisition unit, acquiring the transmission condition information from the one or the plurality of slave camera devices by communicating with the one or the plurality of slave camera devices, and acquiring the transmission condition information detected by the detection unit of the master camera device; and a control unit configured to control an encoding level representing a degree of the encoding process, sequentially from an encoder having a lower priority, including the encoders of the master camera device, to improve the transmission condition, by performing communication with the one or the plurality of slave camera devices upon detection of a worsening transmission condition relative to a predetermined threshold in the transmission condition information.

According to still further aspect of the invention, a slave camera device is directly connected to one or a plurality of master camera devices through a network to form one network segment, and the slave camera device comprises: one or a plurality of encoders, each of which having a priority, forming and transmitting encoded data obtained by performing predetermined encoding process on a captured image; a detection unit detecting a transmission condition of the encoded data, and forming transmission condition information; a condition transmission unit transmitting the transmission condition information to the master camera device, the transmission condition information being detected by the detection unit upon reception of an acquisition request for the transmission condition information through communication with the master camera device; and a control unit configured to control an encoding level representing the degree of encoding process of the one or the plurality of encoders, sequentially from an encoder having a lower priority that is specified through a communication with the one or the plurality of master camera devices to improve the transmission condition, upon worsening of the transmission condition relative to a predetermined threshold. The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Detailed description will be made of an embodiment of a surveillance camera system to which a camera system, a master camera device and a slave camera device, according to the present invention, is applied, with reference to the accompanying drawings.

Summary

Generally, delivery control of the surveillance camera system is performed by individually controlling the camera devices by themselves, or performed systematically by a centralized control device such as a personal computer device or recorder device for monitoring or surveillance. In a case where the camera devices individually control themselves, they are not controlled systematically. Further, in a case where the camera devices are systematically controlled by the centralized control device, all image signals are collected thereto, and the centralized control device may be always overloaded.

In the surveillance camera system according to the present embodiment, one or a plurality of master camera devices registered as a master, and one or a plurality of slave camera devices are connected to each other through a predetermined network, and one segment as a control unit is formed.

Further, each of the master and slave camera devices has a function of storing information representing whether the camera device itself is the master camera device, information about priorities of encoders, or information representing whether to control any one of a compression ratio and a transmission rate, upon controlling an encoding level. Alternatively, the master and slave camera devices have a function of setting this information using, for example, a camera control command (application programming interface (API) command) using a hypertext transfer protocol (HTTP) GET command or a user interface.

The master camera device of each segment monitors a transmission condition of itself, and monitors a transmission condition of each slave camera device in the segment, for example, by communication such as multicast communication. In a case where the master camera device detects a worsening transmission condition, the master camera device controls the encoding level representing the degree of encoding to improve the transmission condition, sequentially from an encoder having a lower priority, including the encoder of itself (stepwise control). Thus, control can be performed systematically and in line with the network traffic and merit of use of the camera (the captured image is important to be captured in real-time in the surveillance camera system).

Constitution of Embodiment

Figure 1:
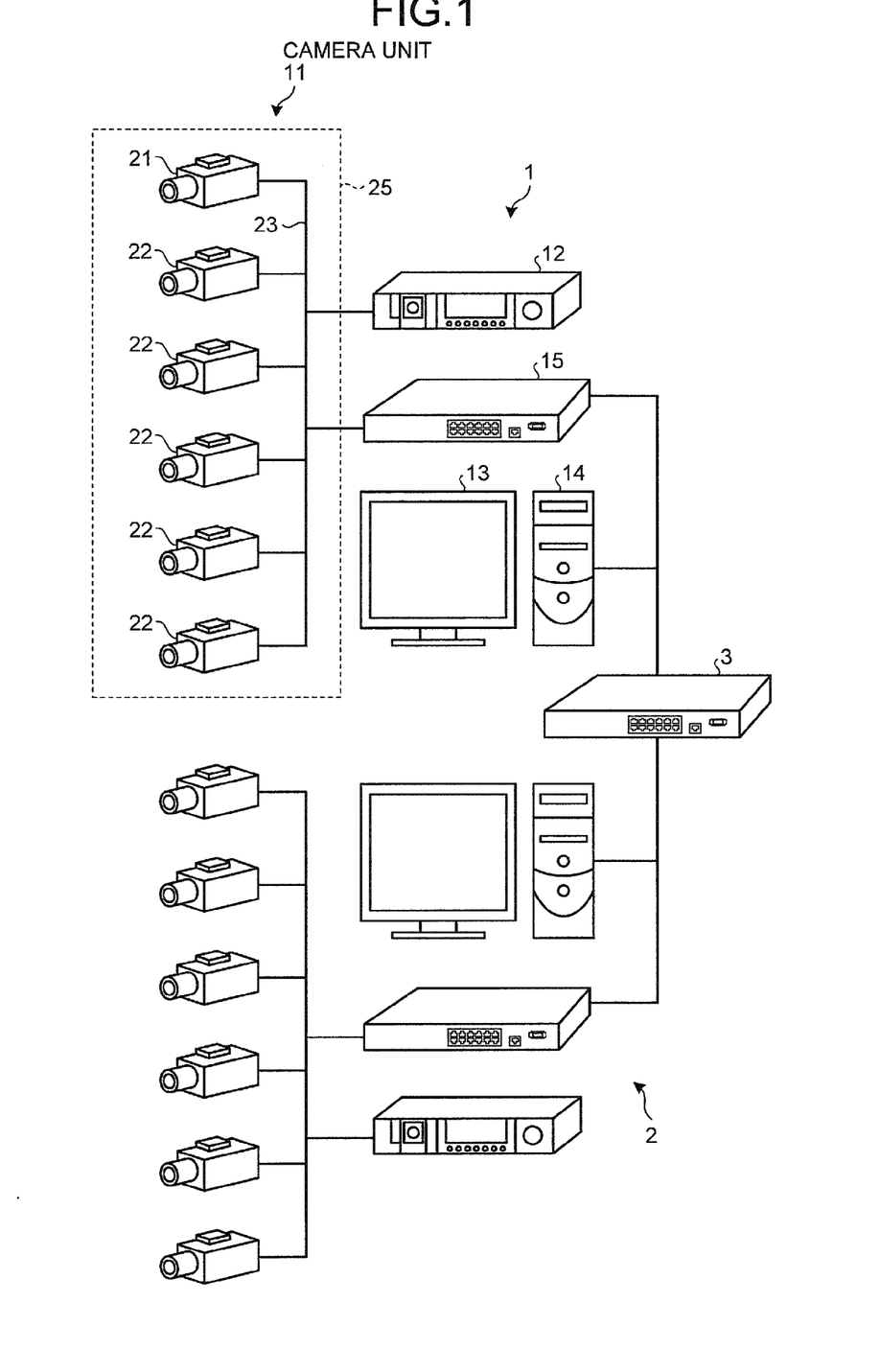
FIG. 1 is a constitution diagram of a surveillance camera system according to an embodiment of the present invention.

FIG. 1 illustrates a system constitution diagram of the surveillance camera system according to an embodiment of the present invention. The surveillance camera system is constituted to connect a plurality of monitoring units 1 and 2 to each other through a repeater such as a router device 3. The monitoring units 1 and 2 have the same constitution. The constitution of the monitoring unit 1 will be described below. The description of the monitoring unit 1 should be referred to for a constitution of the monitoring unit 2 described below.

The monitoring unit 1 includes a camera unit 11, a recording device 12, a monitoring device 13, a personal computer device 14, and a router device 15. The recording device 12 records a captured image transmitted from the camera unit 11, in a hard disk, semiconductor memory, or the like. The router device 15 is connected to the router device 3 connecting the monitoring units 1 and 2, through the predetermined network.

Figure 2:
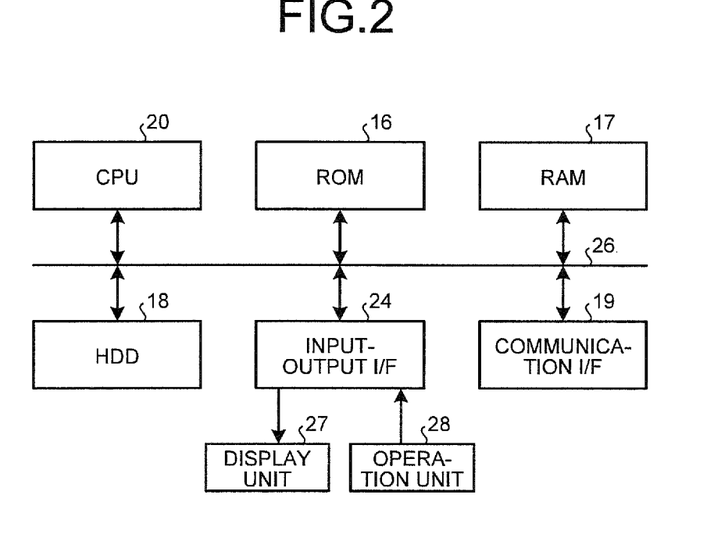
FIG. 2 is a hardware constitution diagram of a personal computer device of a surveillance camera system according to an embodiment.

FIG. 2 is a hardware constitution diagram of the personal computer device 14. As illustrated in FIG. 2, the personal computer device 14 includes a CPU 20, ROM 16, RAM 17, a hard disk drive (HDD) 18, an input-output interface (I/F) 24, and a communication I/F 19. CPU is an abbreviation for "central processing unit". ROM is an abbreviation for "read only memory". RAM is an abbreviation for "random access memory". The CPU 20, the ROM 16, the RAM 17, the HDD 18, the input-output I/F 24, and the communication I/F 19 are connected to each other through a bus line 26 for mutual communication.

To the input-output I/F 24, a display unit 27 (=the above-mentioned monitoring device 13) is connected which displays an operation menu, a print setting screen, an approval route setting screen, an image, or the like thereon. Further, to the input-output I/F 24, an operation unit 28 such as a keyboard or a mouse device is connected which receives user input. Still further, to the input-output I/F 24, a data interface, such as a USB, can be also connected which inputs and outputs data to and from another device. USB is an abbreviation for "universal serial bus". Still another further, to the input-output I/F 24, a drive device can be also connected which reads data from a recording medium such as a CD or a DVD. CD is an abbreviation for "compact disc (registered trade mark)". DVD is an abbreviation for "digital versatile disc".

In the HDD 18, a monitoring control program is stored which control the camera unit 11. The CPU 20 performs, for example, control of setting the level of each encoder of the camera unit 11 according to the monitoring control program. Note that the monitoring control program may be stored, for example, in the ROM 16 or the RAM 17, in addition to the HDD 18. Further, the monitoring control program may be stored on a computer device on the predetermined network and may be obtained by being downloaded through the network. In addition to the above-mentioned constitution, a printer driver may be obtained which is recorded in a computer-readable recording medium such as a CD or a DVD in an installable format file or in an executable format file.

The camera unit 11 connects, directly and not through a repeater or the like, the one (or the plurality of) master camera device 21 and the plurality of (or the one) slave camera devices 22 through the predetermined network 23. The one master camera device 21 and the plurality of slave camera devices 22 form a network segment 25 as the control unit. The master camera device 21 and the slave camera devices 22 are directly connected without through the repeater or the like, and multicast communication can be performed from the master camera device 21 to the slave camera devices 22. The master camera device 21 monitors a communication condition while performing multicast communication with the slave camera devices 22 in the network segment 25, controls the encoding level of the encoders of each of the camera devices 21 and 22, and maintains a preferable communication condition.

Figure 3:
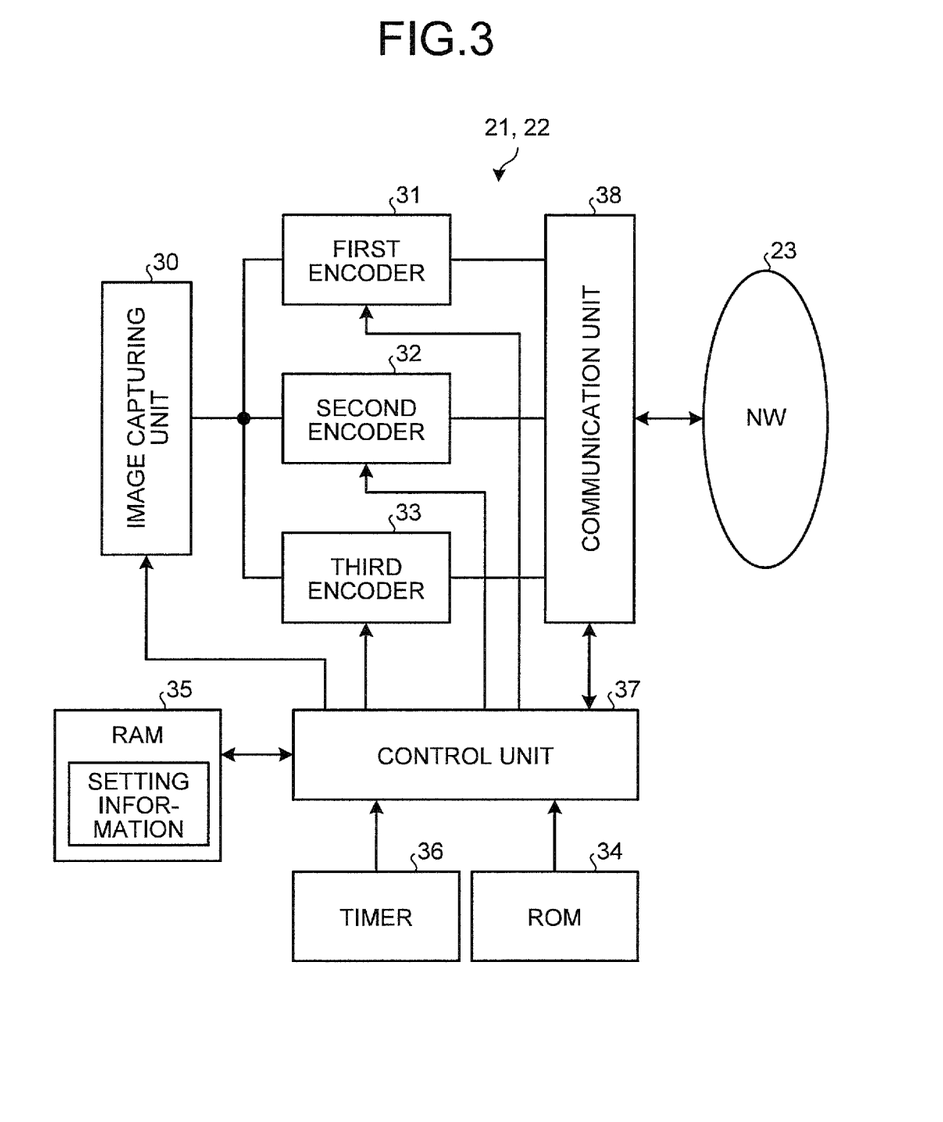
FIG. 3 is a block diagram of a master camera device and a slave camera device of a surveillance camera system according to an embodiment.

FIG. 3 illustrates a hardware constitution diagram of the master camera device 21 and the slave camera device 22. As illustrated in FIG. 3, the master camera device 21 and the slave camera device 22 each have an image capturing unit 30, first to third encoders 31 to 33, ROM 34, RAM 35, a timer 36, a control unit 37, and a communication unit 38.

The image capturing unit 30 includes, for example, a CCD image sensor or a CMOS image sensor. The image capturing unit 30 images an object to be monitored which is monitored by the surveillance camera system, and forms an captured-image signal (captured image). CCD is an abbreviation for "charge coupled device". Further, CMOS is an abbreviation for "complementary metal-oxide semiconductor".

A first encoder 31 to a third encoder 33 perform predetermined compression encoding on the captured-image signal from the image capturing unit 30 to encode the captured-image signal to be output at a predetermined transfer rate. To the encoders 31 to 33, the priorities are set. The encoders 31 to 33 each encode and output the captured-image signal, at a compression ratio and a transfer rate corresponding to the set priority.

The RAM 35 stores setting information representing the priorities set to the encoders 31 to 33, an object to be controlled, or the like. Note that the setting information representing the object to be controlled indicates information representing encoding process using a rate selected from the compression ratio and the transfer rate each having a degree which is changeable by the encoder.

The ROM 34 stores a monitoring control program. In the master camera device 21, the control unit 37 is operated according to the monitoring control program stored in the ROM 34, performs multicast communication with the slave camera devices 22 at predetermined time intervals measured by the timer 36, and detects the transmission condition of each slave camera device 22. Further, the control unit 37 of the master camera device 21 also detects the transmission condition of itself. In order to improve the detected transmission condition, the control unit 37 of the master camera device 21 controls the encoders 31 to 33 of itself sequentially from the encoder having a lower priority, and improves the transmission condition.

Further, in the slave camera device 22, the control unit 37 is operated according to the monitoring control program stored in the ROM 34, and calculates an average value of transmission timing lag within a predetermined time period measured by the timer 36. In the slave camera device 22, the control unit 37 transmits the calculated average value to the master camera device 21, according to a transmission condition acquisition request transmitted from the master camera device 21. Further, in the slave camera device 22, the control unit 37 controls encoding process using multicast communication, sequentially from the encoders 31 to 33 having a priority specified by the master camera device 21, and improves the transmission condition.

Each of the communication units 38 of the master camera device 21 and the slave camera device 22 is connected to the recording device 12, the personal computer device 14, and the router device 15 through the network (NW) 23, and transmits, to the recording device 12, for example, an image signal to be recorded, subjected to the compression encoding processing at a low compression ratio, and having a high transfer rate. Further, the communication unit 38 of the master camera device 21 transfers a transmission condition control history, in a case where an acquisition request is transmitted from the personal computer device 14 or the like.

The priorities or the like of the encoders 31 to 33 of the master camera device 21 and the slave camera device 22 are set by the personal computer device 14. When setting the priorities or the like, the CPU 20 illustrated in FIG. 2 controllably displays, for example, a setting screen as illustrated in FIG. 4 on the display unit 27 (monitoring device 13), according to the monitoring control program recorded in the HDD 18.

Figure 4:
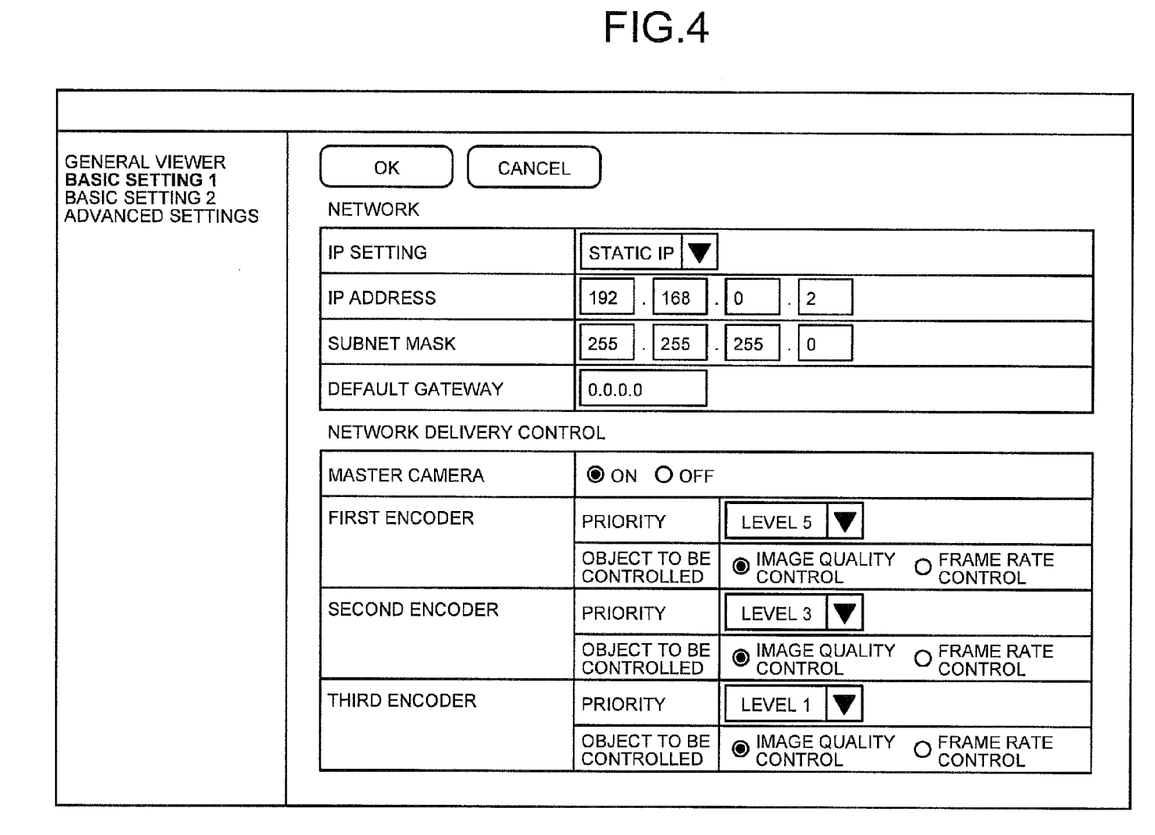
FIG. 4 is a schematic diagram of a setting screen for priority or the like of encoders provided at camera devices of a surveillance camera system according to an embodiment.

As illustrated in FIG. 4, the setting screen includes a network setting column for setting local IP addresses or the like for the master camera device 21 and the slave camera device 22, and a network delivery control setting column for setting priorities or the like of the encoders. The network delivery control setting column includes a master-camera setting column (ON/OFF) for setting whether the camera device is functioned as the master camera device 21, priority setting columns for setting priorities of the encoders, and object-to-be-controlled selection columns for selecting an object to be controlled in encoding process.

In a case where "ON" is selected in the master-camera setting column, the control unit 37 causes selected camera device to function as the master camera device 21. In a case where "OFF" is selected in the master-camera setting column, the control unit 37 causes selected camera device to function as the slave camera device 22.

In the surveillance camera system according to the present embodiment, the priority can be set between, for example, level 1 (low) to level 5 (maximum). The priority of level 5 is a priority which is set in a case where encoding at a low compression ratio and a maximum transfer rate is desired to be set. Further, the priority of level 5 is a priority which inhibits change of encoding process performed by the control unit 37. The priority of level 5 is set, for example, to the encoder generating the captured image recorded by the recording device 12.

In contrast, the control unit 37 can change the priorities of level 1 (low) to level 4 (high) according to the transmission condition, as described later. An observer sets a desired level of priority according to the level of importance or the like in use of the captured image generated by the encoder. In an example illustrated in FIG. 4, the priority of level 5 is set to the first encoder 31, the priority of level 3 is set to the second encoder 32, and the priority of level 1 is set to the third encoder 33.

Further, in the surveillance camera system according to the present embodiment, any one of "image quality control" and "frame rate control" is set as an object to be controlled. The object to be controlled is controlled according to the transmission condition. The "image quality control" signifies control of the compression ratio. In a case where the "image quality control" is selected, the control unit 37 encodes the captured image to have a compression ratio corresponding to the level of priority. Further, the "frame rate control" signifies control of the transfer rate. In a case where the "frame rate control" is selected, the control unit 37 controls output of the captured image encoded at a transfer rate corresponding to the level of priority.

The observer sets the priority, the object to be controlled, or the like for each of the master and slave camera devices 21 and 22. The setting information of the master camera device 21 and the setting information of the slave camera device 22 are stored in the RAM 35 or the like illustrated in FIG. 3. The control units 37 of the master camera device 21 and the slave camera device 22 each control the encoding process of the compression ratio or the transfer rate, represented by information about an object to be controlled in the setting information, sequentially from the encoder having a lower priority of the setting information, and maintain stable transmission condition.

Figure 5:
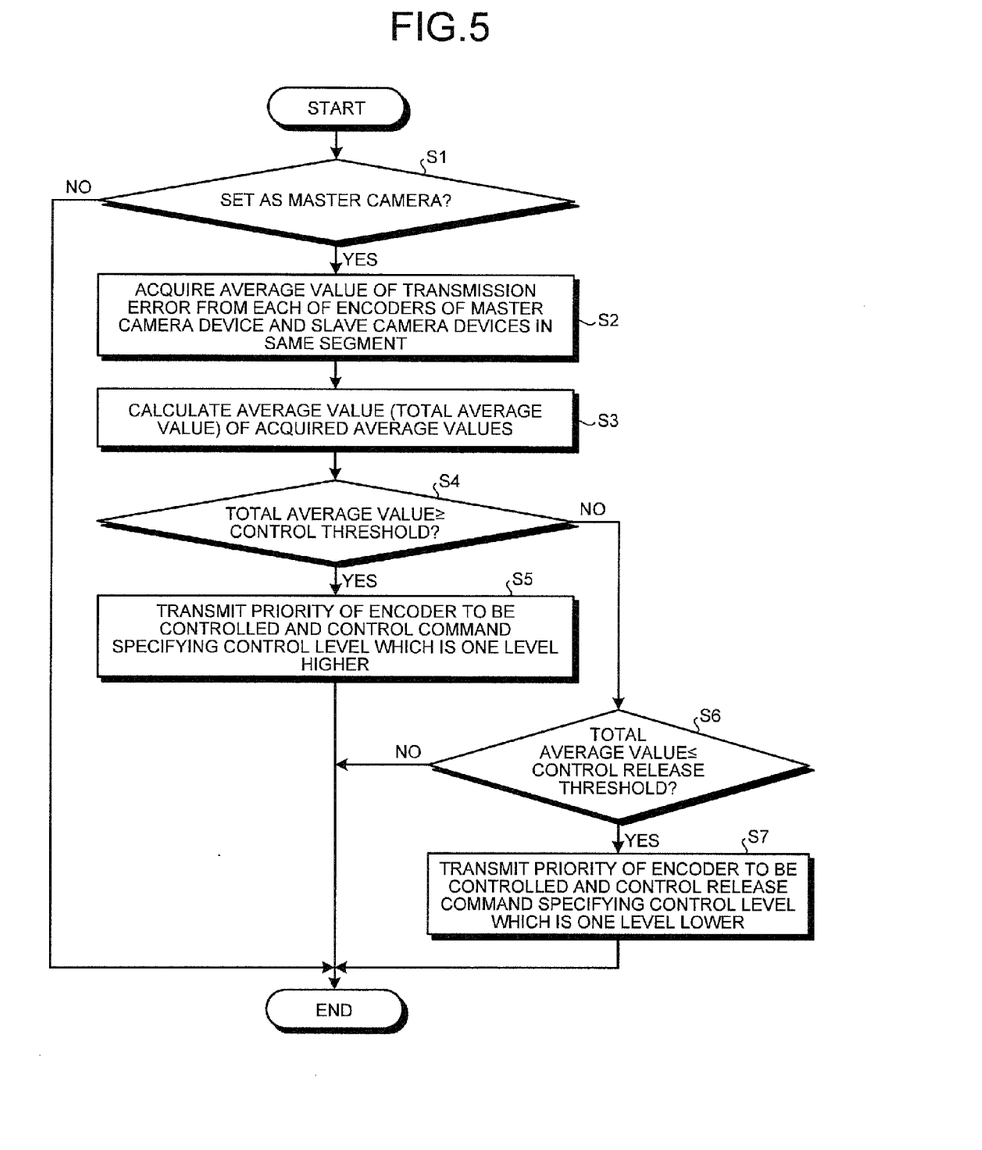
FIG. 5 is a flowchart illustrating operation of a master camera device of a surveillance camera system according to an embodiment.

Next, operation of the surveillance camera system according to the embodiment will be described. First, FIG. 5 is a flowchart illustrating an operation flow of the master camera device 21. The control unit 37 of the master camera device 21 starts a process from step S1 in the flowchart of FIG. 5, according to the monitoring control program stored in the ROM 34, each time the timer 36 counts 10 seconds (=processing of the flowchart of FIG. 5 is performed every ten seconds), for example.

In step S1, the control unit 37 reads the setting information stored in the RAM 35 to determine whether the camera device itself is set as the master camera device 21 (whether setting of the master camera device 21 is ON or OFF). In a case where the camera device itself is determined to be set not as the master camera device 21 (step S1: No), the determination signifies that the camera device is the slave camera device 22, so that the control unit 37 finishes the flowchart of FIG. 5, and the process proceeds to step S11 in a flowchart of FIG. 6.

In contrast, in a case where the camera device itself is determined to be set as the master camera device 21 (step S1: Yes), the control unit 37 advances the process to step S2. In step S2, the control unit 37 performs multicast communication to simultaneously make an acquisition request for an average value of transmission error of encoded data, to the slave camera devices 22 in the same network segment 25. The control unit 37 of each slave camera device 22 and the control unit 37 of the master camera device 21 each calculate the average value of the transmission error of encoded data within periods of ten seconds, as described later. Then, in a case where each slave camera device 22 receives the acquisition request for the average value of the transmission error, as descried above, each slave camera device 22 transmits the calculated average value to the master camera device 21.

In a case where the control unit 37 of the master camera device 21 acquires the average values from the slave camera devices 22, the process proceeds to step S3. In step S3, the control unit 37 of the master camera device 21 calculates an average value (total average value) of the transmission error in the whole network segment 25, based on average values acquired from the slave camera devices 22, and the average value of the transmission error of the master camera device 21.

Next, in step S4, the control unit 37 of the master camera device 21 compares the total average value and a control threshold value for determining whether control of encoding of the encoders 31 to 33 is performed. The total average value is not less than the control threshold value signifies that the network traffic is in congestion, and the transmission condition of the encoded data is worsening (step S4: Yes). In this case, the control unit 37 advances the process to step S5.

In step S5, the control unit 37 of the master camera device 21 simultaneously transmits, to each slave camera device 22, the priority of the encoder to be controlled, and a control command specifying a control level which is one level higher, using multicast communication, and terminates the process in the flowchart of FIG. 5. As described later, the control unit 37 of each slave camera device 22 controls the control level of the encoder to be controlled, according to the control command. The control unit 37 of the master camera device 21 also controls the control level of the encoder to be controlled of the master camera device 21, based on the control command transmitted to each slave camera device 22.

In contrast, in a case where comparison between the total average value and the control threshold results in that the total average value is smaller than the control threshold, the result signifies smooth network traffic and preferable transmission condition of the encoded data. In this case (step S4: No), the control unit 37 advances the process to step S6, and compares the total average value and a control release threshold value for determining whether the control level of each of the encoders 31 to 33 is returned to a level which is one level lower.

The total average value being larger than the control release threshold value signifies smooth network traffic and stable transmission condition of the encoded data. In this case (step S6: No), the control level of each of the encoders 31 to 33 does not need to be controlled, and the control unit 37 terminates the process in the flowchart of FIG. 5.

In contrast, the total average value being not more than the control release threshold value indicates a concern that the network traffic is extremely smooth because the control level of each of the encoders 31 to 33 is too high. In this case (step S6: Yes), the control unit 37 advances the process to step S7, simultaneously transmits, to each slave camera device 22, the priority of the encoder to be controlled, and a control release command specifying a control level which is one level lower, using multicast communication, and terminates the process in the flowchart of FIG. 5. As described later, the control unit 37 of each slave camera device 22 controls the control level of the encoder to be controlled, according to the control release command. The control unit 37 of the master camera device 21 also controls the control level of the encoder to be controlled of the master camera device 21, based on the control release command transmitted to each slave camera device 22.

Figure 6:
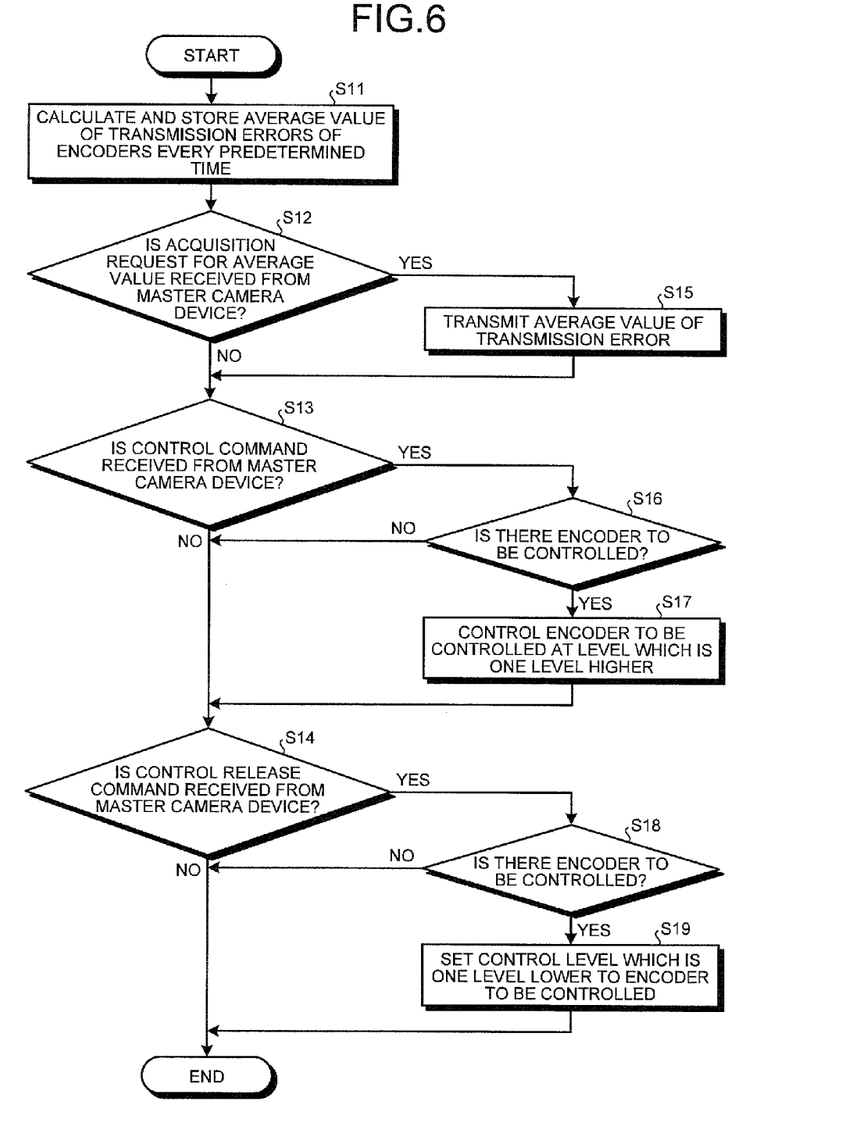
FIG. 6 is a flowchart illustrating operation of a slave camera device of a surveillance camera system according to an embodiment.

Next, the flowchart of FIG. 6 illustrates an operation flow of the slave camera device 22. The control unit 37 of the slave camera device 22 starts a process from step S11 in the flowchart of FIG. 6, according to the monitoring control program stored in the ROM 34.

In step S11, the control unit 37 of the slave camera device 22 calculates the average value of the transmission errors of the encoders 31 to 33 within periods of, for example, ten seconds counted by the timer 36, and temporarily stores the average value in the RAM 35. More specifically, a time lag in transmission interval between frames of the captured image relative to an ideal frame interval calculated based on the set frame rate is detected as the transmission error of each of the encoders 31 to 33. The control unit 37 of the slave camera device 22 normally stores a frame interval of the captured image being delivered by the slave camera device 22, in the RAM 35, over periods of ten seconds. Then, the control unit 37 calculates an average of absolute values of an average value of a delay in the ideal frame interval and an average value of an advance in the ideal frame interval, every ten seconds, and stores, in the RAM 35, the average as information representing the transmission condition of the slave camera device.

Figure 7:
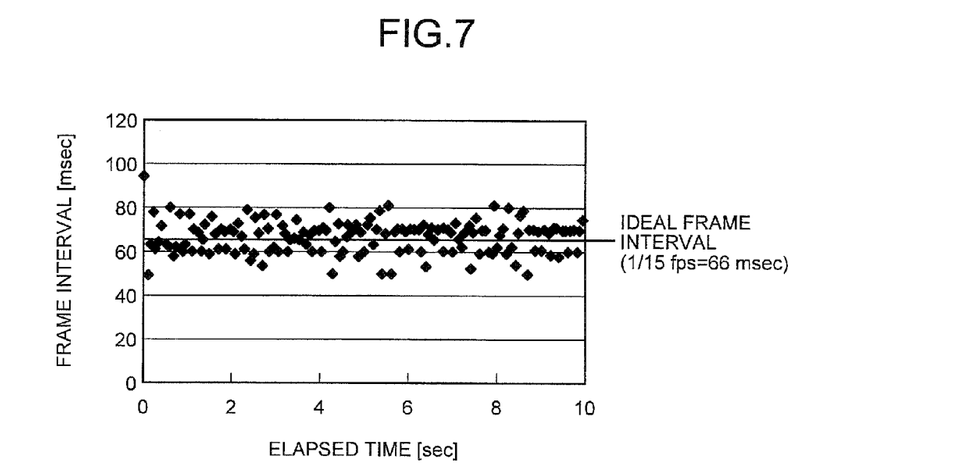
FIG. 7 is a graph illustrating fluctuation in frame transmission interval per ten minutes of a slave camera device provided at a surveillance camera system according to an embodiment.

For example, FIG. 7 illustrates an example of an ideal frame interval of 1/15 fps (66 msec), and illustrates gaps between frame intervals of the encoders 31 to 33 within periods of ten seconds. Dots displayed above a line indicating the ideal frame interval represent the frame interval delayed in time. Dots displayed below the line indicating the ideal frame interval represent the frame interval advance in time.

In a case where the average value of the frame interval delayed in time is 5.4 msec, and the average value of the frame interval advanced in time is 6.8 msec, the control unit 37 of the slave camera device 22 performs a calculation of: "(5.4 msec+6.8 msec)/2=6.1 msec". The control unit 37 of the slave camera device 22 stores, in the RAM 35, the average value (transmission interval average value) of the absolute values of the average value of the delay in the ideal frame interval and the average value of the advance in the ideal frame interval which are calculated as described above. The control unit 37 of the slave camera device 22 performs the above-mentioned calculation every ten seconds, and stores the transmission interval average value within periods of the ten seconds, in the RAM 35.

Next, in step S12, the control unit 37 of the slave camera device 22 determines whether the acquisition request for the average value representing the transmission condition is received from the master camera device 21, using the multicast communication. In a case where it is determined that the acquisition request for the average value representing the transmission condition is not received (step S12: No), the control unit 37 of the slave camera device 22 advances the process to step S13. In contrast, in a case where it is determined that the acquisition request for the average value representing the transmission condition is received (step S12: Yes), the control unit 37 of the slave camera device 22 advances the process to step S15, and transmits the transmission interval average value stored in the RAM 35 to the master camera device 21. The control unit 37 of the master camera device 21 determines a current transmission condition of the encoded data, based on the transmission interval average values acquired from the slave camera devices 22, and controls the control levels of the encoders 31 to 33, as described below.

Next, in step S13, the control unit 37 of the slave camera device 22 determines whether the control command is received from the master camera device 21. In a case where the control unit 37 of the slave camera device 22 determines that the control command is not received from the master camera device 21 (step S13: No), the process proceeds to step S14. In contrast, in a case where the control unit 37 of the slave camera device 22 determines that the control command is received from the master camera device 21 (step S13: Yes), the control unit 37 of the slave camera device 22 advances the process to step S16. In a case where the master camera device 21 determines that the transmission condition worsens, the priority of the encoder performing control is specified, and the control command is transmitted from the master camera device 21. Therefore, the control unit 37 of the slave camera device 22 compares the priority specified in the control command, with the priorities set to the encoders 31 to 33 of the slave camera device 22, and determines whether the encoders 31 to 33 of the slave camera device 22 include an encoder having a priority not more than the priority specified in the control command.

Specifically, in a case where the priority of level 3 is specified in the control command, the control unit 37 of the slave camera device 22 determines whether the slave camera device 22 includes an encoder to be controlled having a priority of level 3, level 2, or level 1. In a case where the slave camera device 22 includes no encoder to be controlled (step S16: No), the process proceeds to step S14. In a case where the slave camera device 22 includes the encoder to be controlled (step S16: Yes), the control unit 37 of the slave camera device 22 advances the process to step S17, increases the level of the priority of the encoder to be controlled by one level, and controls the encoder to be controlled to perform encoding having a degree corresponding to the priority having the increased level.

For example, in a case where the priority of the encoder to be controlled is level 1, the control unit 37 of the slave camera device 22 changes the priority of the encoder to be controlled to level 2, and controls the encoder to be controlled to perform encoding of a degree changed to level 2. Note that the control unit 37 changes and controls the degree of the level of selected encoding process between the encoding process of the compression ratio and the encoding process of the transfer rate. Therefore, for example, the compression ratio of the encoder having a priority of not more than level 3 is increased, or the transfer rate thereof is reduced, and transmission of the encoded data can be performed. Therefore, the transmission condition can be improved.

Next, in step S14, the control unit 37 of the slave camera device 22 determines whether the control release command is received from the master camera device 21. In a case where the control unit 37 of the slave camera device 22 determines that the control release command is not received (step S14: No), the process of all steps in the flowchart of FIG. 6 ends. In contrast, in a case where the control unit 37 of the slave camera device 22 determines that the control release command is received (step S14: Yes), the process proceeds to step S18. In a case where the master camera device 21 determines that the transmission condition has a sufficient room, the priority of the encoder performing the control is specified, and the control release command is transmitted from the master camera device 21. Therefore, the control unit 37 of the slave camera device 22 compares the priority specified in the control release command, with the priorities set to the encoders 31 to 33 of the slave camera device 22, and determines whether the encoders 31 to 33 of the slave camera device 22 include an encoder having a priority not more than the priority specified in the control release command.

Specifically, in a case where the priority of level 2 is specified in the control release command, the control unit 37 of the slave camera device 22 determines whether the slave camera device 22 includes an encoder to be controlled having a priority of level 2 or level 1. In a case where the slave camera device 22 includes no encoder to be controlled (step S18: No), the process in the flowchart of FIG. 6 ends. In a case where the slave camera device 22 includes the encoder to be controlled (step S18: Yes), the control unit 37 of the slave camera device 22 proceeds the process to step S19, reduces the level of the priority of the encoder to be controlled by one level, and controls the encoder to be controlled to perform encoding having a degree corresponding to the priority having the reduced level.

For example, in a case where the priority of the encoder to be controlled is level 2, the control unit 37 of the slave camera device 22 changes the priority of the encoder to be controlled to level 1, and controls the encoder to be controlled to perform encoding of a degree changed to level 1. Note that the control unit 37 changes and controls the degree of the level of selected encoding process between the encoding process of the compression ratio and the encoding process of the transfer rate. Therefore, for example, the compression ratio of the encoder having a priority of not more than level 2 is reduced, or the transfer rate thereof is increased, and transmission of the encoded data can be performed. Therefore, a communication band of the network can be effectively used to perform transmission and reception of the encoded data.

Figure 8:
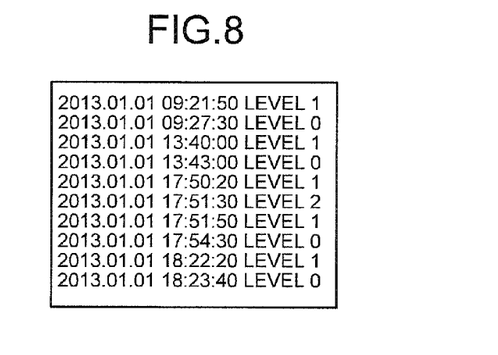
FIG. 8 is a diagram illustrating an exemplary control history held by a master camera device provided at a surveillance camera system according to an embodiment.
Figure 9:
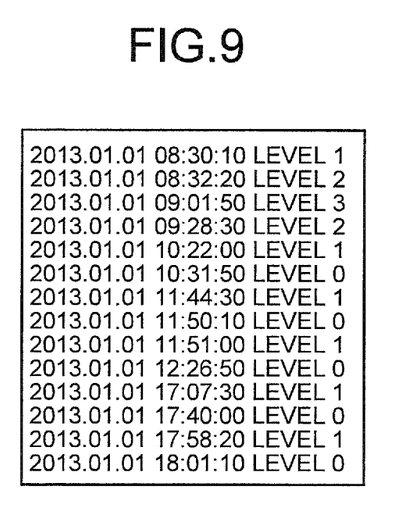
FIG. 9 is a diagram illustrating another exemplary control history held by a master camera device provided at a surveillance camera system according to an embodiment.

Next, the control unit 37 of the master camera device 21 stores, in the RAM 35, the transmission interval average values acquired from the slave camera devices 22 and a transmission interval average value of the master camera device 21. Thus, in the RAM 35 of the master camera device 21, a history of the transmission interval average value is formed, as illustrated in FIG. 8 or 9. In this history, a control time and date and the level of priority are recorded, and a condition in which level control is completely released is recorded as level 0.

In a case where the control unit 37 of the master camera device 21 receives a transmission request for the history, for example, from another device such as the personal computer device 14, the control unit 37 reads the history of the transmission interval average value, as illustrated in FIG. 8 or 9, from the RAM 35, and transfers the history. By analyzing the history, a period of time or the like in which the transmission conditions of the encoders 31 to 33 worsen can be recognized. For example, in the history illustrated in FIG. 9, the network traffic congestion occurs at about 9:00 in the morning, and an unstable delivery interval of the frames can be recognized.

As is clear from the above description, the surveillance camera system according to an embodiment of the present invention directly connects the master camera device 21 and the plurality of slave camera devices 22 through the network, and forms one network segment 25. The master camera device 21 and the slave camera devices 22 detect transmission condition of the encoded data. The master camera device 21 performs multicast communication with each slave camera device 22, and acquires the information representing the transmission condition from each slave camera device 22. In a case where the master camera device 21 detects a worsening transmission condition from transmission conditions of the slave camera devices 22 and a transmission condition of the master camera device 21 itself, the master camera device 21 performs multicast communication with the slave camera devices 22, and controls the encoding level representing the degree of encoding to improve the transmission condition, sequentially from the encoder having a lower priority, including the encoder of the master camera device 21.

The master camera device 21 controls the degree of encoding process to improve the transmission condition, sequentially from the encoder having a lower priority, at the timing of detecting the worsening transmission condition. Therefore, transmission condition can be improved at a comparatively initial stage of the unstable transmission condition, and disadvantage of awkward movement of an object displayed in a video image can be prevented. Further, disadvantage of considerably worsening transmission condition finally leading to discarding of packets can be strongly prevented.

The surveillance camera system requires a real-time and continuous video image to be displayed in order to monitor the object to be monitored. The surveillance camera system according to the embodiment of the present invention can provide an ideal surveillance camera system which provides a satisfactory real-time and continuous video image.

Further, the encoder connected to the recording device 12 in which, for example, a high-quality image for the purpose of storage is recorded has high level of importance, and change of encoding settings such as the compression ratio or the transfer rate is not desirable. The surveillance camera system according to the embodiment of the present invention controls the encoder having a lower priority at first, and thus, change of settings of the encoder having a higher priority is prevented as much as possible, and the worsening transmission condition can be improved.

Further, a control level of the encoding is changed and controlled one by one. Therefore, the number of bits of a change control signal required for the control level can be defined as one bit. Thus, in a case where the change control signal is multicast transmitted to each slave camera device 22, the control level can be changed and controlled without stress on the network.

Further, the personal computer device 14 and each of the camera devices 21 and 22 are connected to each other through the router device 15. For example, even if the personal computer device 14 simultaneously controls each of the camera devices 21 and 22 using multicast communication, the control signal from the personal computer device 14 is blocked by the router device 15, and control of each of the camera devices 21 and 22 is made difficult. Thus, in a case where the personal computer device 14 controls the camera devices 21 and 22, the personal computer device 14 needs to specify the camera devices one by one to perform the control. It is extremely inefficient to perform the control.

In contrast, the surveillance camera system according to the present embodiment does not have another repeater such as the router device 15, and the master camera device 21 can directly communicates with each slave camera device 22.

Therefore, the master camera device 21 can simultaneously communicate with each slave camera device 22 to perform control of the communication condition having been described above, and efficient control can be performed.

According to the present invention, the efficient communication improves the transmission condition at the initial stage of the unstable transmission condition, and the preferable real-time image can be obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A camera system comprising:
   one or a plurality of master camera devices; and
   one or a plurality of slave camera devices that are directly connected to the one or the plurality of master camera devices through a network, and form one network segment together with the one or the plurality of master camera devices, wherein
   each of the one or the plurality of master camera devices and the one or the plurality of slave camera devices includes
      one or a plurality of encoders, each of which having a priority, and configured to form and transmit encoded data obtained by performing predetermined encoding process on a captured image, and
      a detection unit configured to detect a transmission condition of the encoded data, and form transmission condition information, wherein
   each of the one or the plurality of master camera devices further includes
      a transmission condition acquisition unit configured to communicate with each of the one or the plurality of slave camera devices, acquire the transmission condition information from each of the one or the plurality of slave camera devices, and acquire the transmission condition information detected by the detection unit of the each of the one or the plurality of master camera devices, and
      a control unit configured to communicate with the one or the plurality of slave camera devices upon detection of a degradation of the transmission condition of the encoded data relative to a predetermined threshold by comparing the transmission condition of the encoded data with the predetermined threshold in the transmission condition information, and control an encoding level representing a degree of the predetermined encoding process, sequentially from an encoder having a lower priority, including encoders of the one or the plurality of master camera devices, to improve the transmission condition.

2. The camera system according to claim 1, wherein
   in each of the one or the plurality of master camera devices, the control unit communicates with the one or the plurality of slave camera devices, and further configured to restore the controlled encoding level to an original encoding level, including the encoders of the one or the plurality of master camera devices, in a case where the encoding level is controlled and the transmission condition of the encoded data is improved.

3. The camera system according to claim 1, wherein
   each of the one or the plurality of master camera devices further includes a storage unit configured to store a history of the transmission condition information detected by the detection unit of the one or the plurality of master camera devices and the transmission condition information acquired from the one or the plurality of slave camera devices, and
   the control unit is further configured to control the storage unit to transfer the history of the transmission condition information in a case where a transfer request is received.

4. The camera system according to claim 1, wherein
   in each of the one or the plurality of master camera devices and the one or the plurality of slave camera devices, each of the one or the plurality of encoders is configured to perform encoding process for performing predetermined compression encoding on the captured image and forming the encoded data having a predetermined transfer rate, and
   in each of the one or the plurality of the master camera devices, the control unit is further configured to control the one or the plurality of encoders to have a compression encoding ratio or a transfer rate corresponding to the encoding level to be controlled.

5. The camera system according to claim 1, wherein
   in each of the one or the plurality of master camera devices and the one or the plurality of slave camera devices, the detection units are further configured to detect an average value of a transmission timing lag to a reference transmission rate, in a predetermined time period, and output the average value as the transmission condition information.

6. A master camera device directly connected to one or a plurality of slave camera devices through a network to form one network segment, the master camera device comprising:
   one or a plurality of encoders, each of which having a priority, forming and transmitting encoded data obtained by performing predetermined encoding process on a captured image;
   a detection unit configure to detect a transmission condition of the encoded data, and form transmission condition information;
   a transmission condition acquisition unit configure to acquire the transmission condition information from the one or the plurality of slave camera devices by communicating with the one or the plurality of slave camera devices, and acquire the transmission condition information detected by the detection unit of the master camera device; and
   a control unit configured to control an encoding level representing a degree of the encoding process, sequentially from an encoder having a lower priority, including the encoders of the master camera device, to improve the transmission condition, by performing communication with the one or the plurality of slave camera devices upon detection of a degradation of the transmission condition of the encoded data relative to a predetermined threshold by comparing the transmission condition of the encoded data with the predetermined threshold in the transmission condition information.

7. A slave camera device directly connected to one or a plurality of master camera devices through a network to form one network segment, the slave camera device comprising:
   one or a plurality of encoders, each of which having a priority, forming and transmitting encoded data obtained by performing predetermined encoding process on a captured image;

a detection unit configured to detect a transmission condition of the encoded data, and form transmission condition information;

a condition transmission unit configured to transmit the transmission condition information to the master camera device, the transmission condition information being detected by the detection unit upon reception of an acquisition request for the transmission condition information through communication with the master camera device; and a control unit configured to control an encoding level representing the degree of encoding process of the one or the plurality of encoders, sequentially from an encoder having a lower priority that is specified through a communication with the one or the plurality of master camera devices to improve the transmission condition, upon degradation of the transmission condition of the encoded data relative to a predetermined threshold by comparing the transmission condition of the encoded data with the predetermined threshold in the transmission condition information.

* * * * *